Patented Dec. 28, 1943

2,337,672

UNITED STATES PATENT OFFICE 2,337,672

MANUFACTURE OF MULTICELLULAR GLASS

Bernard Long, Paris, France; vested in the Alien Property Custodian

No Drawing. Application November 28, 1939, Serial No. 306,501. In France December 20, 1938

4 Claims. (Cl. 106—40)

The present invention relates to the manufacture of so-called multicellular or foam glass.

For manufacturing such a glass, it is known to create bubbles by the formation of gas in the body of a mass of glass taken in the liquid state or in the powdered state. This evolution of gas is produced at a suitable temperature for the glass to possess an appropriate plasticity, that is to say that said glass must not be too fluid, so that it retains, in its mass, the bubbles formed, and that on the other hand it must not be too viscous in order not to obstruct the free formation of said bubbles.

One of the desirable qualities for such a glass consists in its lightness and the same is obviously directly proportional to the intensity of the evolution of gas.

The purpose of the present invention is precisely to raise this evolution of gas to a high degree of intensity and it consists in obtaining all or part of said evolution by means of reactions which, at the temperatures at which glass welds to itself, produce a gas and simultaneously liberate a substance having a high vapour tension.

According to a particularly advantageous embodiment of this process, the reaction used for causing simultaneously an evolution of gas and the liberation of a substance which has a high vapour tension at the temperature in question, consists in the reduction of an oxygenated compound of such a substance.

Among these substances may be mentioned, in particular, arsenic, cadmium, zinc, antimony, lead, etc. The reduction of the oxygenated compounds of these substances may be effected by means of carbon or coal.

Thus for example in the case of arsenic, the following reactions are effected:

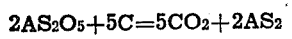

With the other substances mentioned, the reactions used would be similar.

It may be considered that the considerable swelling that has been observed is due to the fact that the simultaneous presence, inside each of the bubbles, of a gas such as $CO_2$ and of a vapour such as that of arsenic, has the result of favouring the change of the said substance into the state of vapour, that is to say of influencing the production of vapour of said substance according to a phenomenon which may be compared to that of the boiling of liquids containing dissolved gases. In particular, if the substance liberated possesses, at the temperature of treatment, a vapour tension which is approximately that of atmospheric pressure, the presence of a gas in the various bubbles that are produced by the reaction may effect the complete conversion of said substance into its vapour.

Said conversion will be better effected as the quantity of the gas evolved is greater. Consequently, and considering the above reactions by way of examples, it is observed that it is advantageous for the substance with a high vapour tension to be liberated from an oxide which is in the most intense state of oxidation. In particular, in the case of arsenic, it is advantageous for the oxygenated compound to be taken in the pentavalent state. In order to obtain this result, known means may be used, for example the addition of oxidizing compounds of manganese, such as manganese dioxide, manganates and permanganates, etc.

For the same purpose, it is recommended to produce the glass, which is intended to be used for the invention, by means of an oxidizing fusion.

The incorporation, in the vitreous material, of the elements—oxygenated compounds, reducing substances—required for the reaction, may be effected in different forms and by any appropriate means.

It is possible, for example, to introduce and disperse said elements in a vitreous material, after same has been brought to the liquid state.

It is also possible to mix them directly, in the powdered state, with glass likewise in the powdered state, and then bring the mixture to a high temperature.

It is further possible to incorporate said elements independently, for example by previously preparing a glass containing the oxygenated compound, then crushing the glass, mixing it with the reducing substance in the powdered state and finally raising the mixture, as in the previous case, to the high temperature at which glass welds to itself.

This latter method of operating offers the advantage of retarding the start of the bubble-generating reaction until the instant when the glass has acquired a certain degree of fluidity and consequently begins to come into intimate contact with the reducing powder. The generation of the bubbles therefore only occurs at the instant when the glass has precisely reached the state of plasticity that is suitable for the formation of multicellular glass.

By applying this method to the case of arsenic, I have found that it is possible to use doses of arsenious anhydride varying between one and five parts to one hundred parts of sand.

In this same case, the dose of manganese compounds will be so adjusted that at the end of the fusion for preparing the glass, same will have a slight pink colour.

Glass containing large doses of arsenic has enabled me to obtain readily plates of multicellular glass having a regular structure, middle sized pores, of 0.15 apparent density. It has also been possible to obtain densities of 0.12 and 0.10.

On the other hand, as mentioned above, it is possible to incorporate the oxygenated compound in the form of a powder containing the carbon and prepared beforehand, said powder being then intimately mixed with the glass powder. This method of carrying out the process is particularly advantageous because it enables use to be made, for the glass powder, of a glass of any nature which is obtained for example from products called "cullet" or waste scraps of ordinary glass.

For example, a powder of ordinary glass, to which is added a mixture of 0.3% of carbon powder and of 2% of arsenious anhydride $As_2O_3$, enables a multicellular glass having an apparent density of 0.20 to be obtained without difficulty. In practice, the doses of carbon powder may vary between 0.2 and 0.5% approximately and the doses of arsenious anhydride between about 0.5 and 5%.

In the practical application of the invention, account must be taken of the degree of the vapour tension of the substance liberated, at the temperature at which the vitreous mass reaches the suitable state of viscosity for swelling or foaming.

According to the invention a composition will be chosen for the vitreous material, which produces a glass, the softening point of which will be higher as the substance to be liberated requires a temperature which is itself higher for developing an efficient vapour tension. Thus, in the case of antimony and of lead, care should be taken that the composition of the glass is such that the state of viscosity suitable for foaming is only acquired by said glass above about 1100° C., which will lead to the use of special so-called high softening point glass.

On the contrary, such a precaution is not necessary when the substance liberated is, for example, arsenic, owing to the fact that the vapour tension of this substance is already considerable about 300° C. and that between 700° and 900° C. ordinary glass acquires the suitable state of viscosity.

The same applies to the use of the oxygenated compounds of cadmium and of zinc, although in these two cases it is advantageous to choose a glass whereof the softening point is higher than in the case of the oxygenated compounds of arsenic.

What I claim is:

1. A process of manufacturing multicellular glass, comprising mixing a glass mass with carbon and an oxide of arsenic for the evolution of gases which produce bubbles in the glass mass at temperatures at which glass welds to itself, heating the mixture to said temperatures to cause said production of bubbles, and then cooling the glass mass while retaining said bubbles therein to produce multicellular glass.

2. A process of manufacturing multicellular glass, comprising mixing a glass mass with carbon and an oxide of cadmium for the evolution of gases which produce bubbles in the glass mass at temperatures at which glass welds to itself, heating the mixture to said temperatures to cause said production of bubbles, and then cooling the glass mass while retaining said bubbles therein to produce multicellular glass.

3. A process of manufacturing multicellular glass, comprising mixing a glass mass with carbon and an oxide of zinc for the evolution of gases which produce bubbles in the glass mass at temperatures at which glass welds to itself, heating the mixture to said temperatures to cause said production of bubbles, and then cooling the glass mass while retaining said bubbles therein to produce multicellular glass.

4. A process of manufactured multicellular glass comprising mixing powdered glass, an oxide of a metal said metal having a volatilization point below the temperature at which said glass welds to itself and therefore a high vapor tension at such temperature, and pulverized carbon, heating the mixture to said temperature and thereby causing a reaction between the carbon and the metal oxide to produce within the glass mixture, constituted by glass particles welded to each other, carbon dioxide and metal vapor so as to form in the glass mass bubbles containing said carbon dioxide and metal vapor, and then cooling the glass mass while retaining said hubbles therein, to produce multicellular glass.

BERNARD LONG.